July 3, 1956 — T. H. PEIRCE — 2,753,008
FLEXIBLE SEALS FOR PEDAL OPENINGS
Filed Aug. 9, 1950 — 2 Sheets-Sheet 1
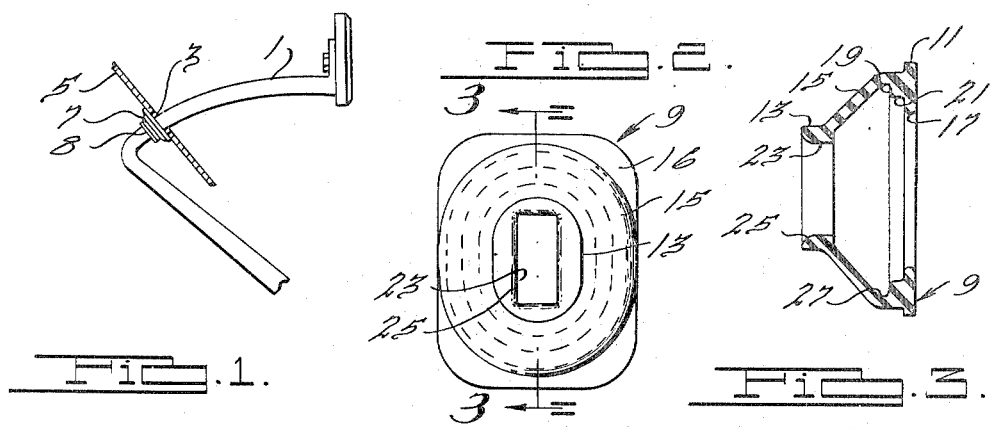
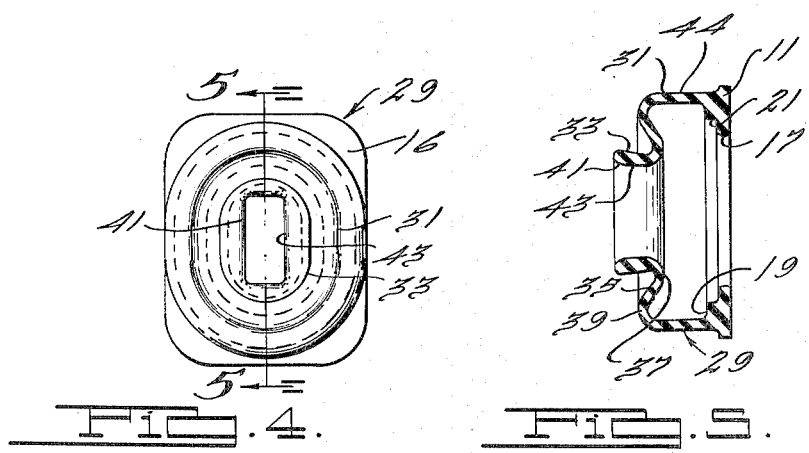
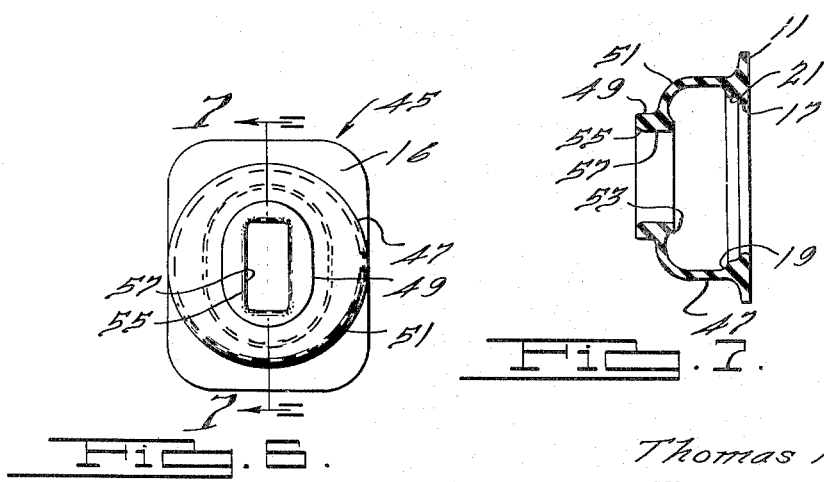
INVENTOR.
Thomas H. Peirce.
BY Harness, Dickey & Pierce
ATTORNEYS.

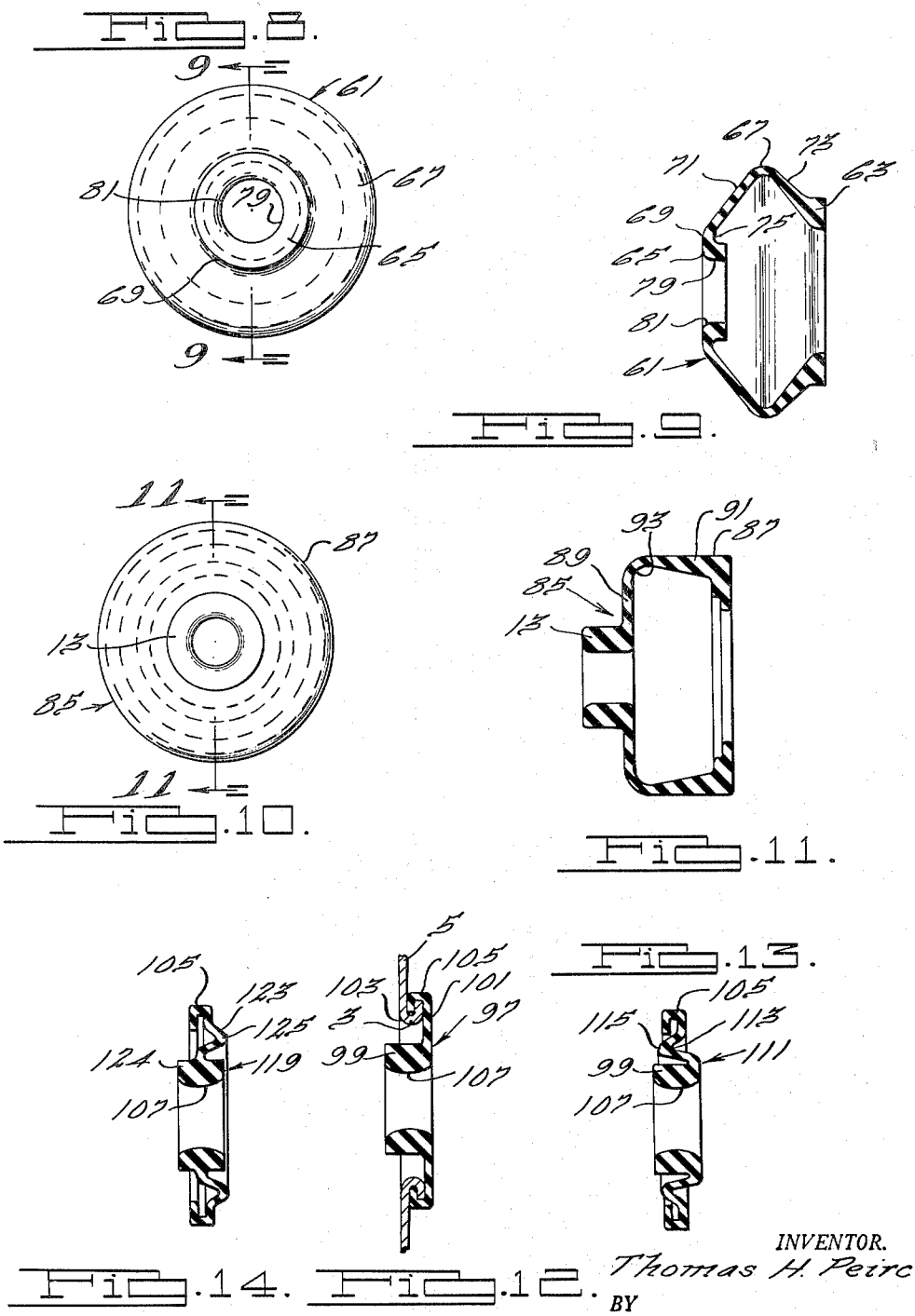

United States Patent Office 2,753,008
Patented July 3, 1956

2,753,008

FLEXIBLE SEALS FOR PEDAL OPENINGS

Thomas H. Peirce, Detroit, Mich.

Application August 9, 1950, Serial No. 178,525

2 Claims. (Cl. 180—90.6)

My invention relates to seals for the openings in automobile floorboards or toeboards through which the clutch and brake pedal shanks pass.

Openings are provided in automobile floorboards so that the shanks of the pedals which the driver actuates may be connected with the mechanism that they are intended to control, e. g., the clutch and the brake system. These openings are made larger than the pedal shanks and thus provide a passage for air and fumes to flow into the interior of the automobile. This is prevented, however, by seals that cover the openings. Preference has been shown by automobile manufacturers for rubber seals which are affixed to either the shank or the floorboard but not to both. The present invention relates to seals that are affixed to one but not both of the shank and floorboard members.

It is an object of the invention to provide pedal seals that exert a minimum resistance to pedal movement and yet are stable so that they do not turn inside out or otherwise render themselves ineffective.

Other objects and features of the invention will become apparent upon consideration of the accompanying drawings, in which:

Figure 1 is a schematic diagram showing how one type of pedal seal is associated with a pedal and a floorboard of an automobile;

Figs. 2 and 3 represent a side view and an axial section, respectively, of one form of pedal seal constructed in accordance with the principles of the invention;

Figs. 4 and 5 represent, respectively, a side view and a section through another form of pedal seal constructed in accordance with the invention;

Figs. 6 and 7 represent, respectively, a side view and an axial section through another modified form of pedal seal embodying the principles of this invention;

Figs. 8 and 9 represent, respectively, a side view and an axial section through a further modification of the invention;

Figs. 10 and 11 are a side view and a section through another form of the invention; and Figs. 12, 13, and 14 are axial sections through modified forms of another type of pedal seal.

As indicated in Fig. 1, the shank 1 of the foot pedal extends through an opening 3 in the floorboard 5, and this opening is larger than the shank 1 so that gases and fumes from the engine as well as cold or hot air may readily pass through it to the interior of the car. A pedal cup 7 is attached to the shank on the underside of the floorboard 5 and engages the floorboard around the opening 3 so as to provide a cover for it which effectively prevents the inflow of air or other gases. This cup is of the type that is attached to the shank 1 and moves with it. The position of the cup 7 on the shank 1 is determined by abutment of its end face with ears or a shoulder 8 formed on the shank. The shoulder 8 is located so that in released position of the shank 1, the cup is collapsed as shown in Fig. 1.

When the cup is in collapsed condition, it is confined between the shoulder 8 on the shank and the bottom of the floorboard 3 and the force with which it tries to return to its natural shape is applied to the shoulder and the floorboard. Insofar as the force is applied to the floorboard, this force is beneficial in that it tends to improve the tightness of the seal. However, the force applied to the shoulder 8 is undesirable when it exceeds certain minimum values. This is the case because a return spring (not shown) for the shank 1 must necessarily supply a greater force in order to hold the cup in collapsed condition and it is principally the force of the return spring which the driver must overcome when depressing the pedal. There has been a tendency, in recent years, due to the fact that most women have learned to drive, to make these springs as soft as possible. As indicated, the limiting factor has been the force required to collapse the pedal cup. The improvements of my invention, which are in part due to my discovery that relatively small changes in structure have marked effects upon resistance to collapse, reside in the discovery of several shapes of pedal cups that furnish excellent seals and that have low rates of deflection so that the collapsing force may be materially reduced, and thus the return spring substantially softened.

One of the important difficulties encountered in attempting to design a soft pedal cup is the turning inside out of the cup when the pedal is released and thus the cup collapsed. When this happens the cup is, of course, substantially useless as a seal. In order to combat this, it has become conventional practice to form the cup with angularly spaced ribs that usually lie in axial planes and extend radially from the web and base of the cup. While these ribs prevent turning inside out, they also increase resistance to collapse and hence necessitate stronger return springs. An advantage of the pedal cups that I disclose herein is that these ribs are not needed to prevent turning inside out, hence the cups have inherently less resistance to collapse than the ribbed cups of the prior art.

Another difficulty sometimes encountered is that the cup surface which engages the underside of the floorboard does not remain flat when collapsed and thus allows air and fumes to leak into the car. This difficulty is not found in the cups described herein.

I have discovered several new forms of pedal cup 7 that meet the requirements and have the advantages indicated above. These are illustrated in the drawings in their natural shape or the form that they assume when unstressed. It is evident, however, that in actual use they are usually axially compressed so that opposite ends of the cup lie in or nearly in the same radial plane, a feature which prevents the cup from serving as a trap for dirt.

In the pedal cup 9 of Figs. 2 and 3, there is a base portion 11 that is adapted to engage the underside of the floorboard around the opening 3, a neck portion 13 that fits around the shank 1 and resiliently grips it, and an annular web portion 15 that integrally interconnects the base and the neck. The neck, the base, and the web are made of rubber or the like and formed integrally with one another by a molding process or other suitable methods. The base 11 has a flange 16 on its floorboard engaging face that is generally rectangular in shape to conform in symmetry to the cross sectional shape of the shank. The base 11 is provided with a radial shoulder 19 that is formed on a larger diameter than the opening 17 by virtue of the flat bottom hole 21 in the base. In the embodiment of the invention shown in Figs. 2 and 3, the web 15 is preferably of uniform thickness and it increases in width uniformly from the surface of the neck 13 to the base 11, i. e., it is straight but inclined to the axis of the cup. The neck 13 has an aperture 23 therein which is preferably of the same shape as a cross section of the shank 1, it being shown in Figs. 2 and 3 as rectangular, and the entire shape of the pedal cup 9 may be oval shaped as illustrated in Fig. 2 to provide a certain symmetry with respect to the opening 23. The outer surface of the neck is parallel to the axis of the apertures and its outer end is provided with a radius 25 flaring outwardly from the inner face of the aperture 23. This face bears against the positioning ears or flanges 8 on the shank 1 and I have found that the radius 25 tends to decrease the resistance of the pedal cup to collapse, possibly because of a decreased friction between the end of the cup and the shank ears or flange. It will be observed that the neck 13 is somewhat thicker than the web 15. This tends to insure a continuously tight grip of the neck on the shank by restricting deformation of the cup to the web 15.

In use the pedal cup 9 is slipped on the shank 1 by stretching the neck 13 over the top end prior to attachment of the foot pad. When the neck 13 is forced into the opening 17 by the return spring, the web 15, being at an angle to the direction of displacement of the neck, is bent about its filleted juncture 27 with the base. Rubber has less resistance to deflection at an angle to its surface than to forces parallel to its surface which tend to stretch or compress it, hence the cup 9 has a low rate of deflection as compared with certain conventional designs. It may be observed that the web 15 could be tapered to increasing thickness at the base, if desired, and as illustrated in Figs. 9 and 11 and by this method a more uniform stress distribution may be achieved.

In the modified pedal cup 29 of Figs. 4 and 5, the base 11 is substantially the same as the pedal cup 9 and hence is referred to by the same reference numeral. The web 31 and the neck 33, however, are of different construction though it will be observed that the neck, like neck 13, is relatively thin-walled though thicker than the web. The neck 33 blends into an S-shaped radial web portion 35 wherein the curve of the S, that is of the lesser radius with respect to the axis of the cup, is arranged to be concave upwardly as shown at 37, and thus is located closer to the base 11 than the outer radius curved S portion 39 which is convex outwardly. The web 31 is preferably of uniform thickness and this is somewhat less than that of the outer portion of the neck 33. The neck 33 has a radius 41 which blends into the aperture 43 through the neck and which therefore corresponds to the radius 25 of the cup 9. A radius is formed, of course, on the inner end of the neck 33 by virtue of the curve 37 on the web. The web 31 includes, in addition to the S-shaped portion 35, a portion 44 of substantially uniform width with respect to the cup axis that extends perpendicularly to the base 11.

The S-shaped portion 35 of cup 29 initiates a rolling action of the web 31 when the neck is forced into the base rather than outward bulging such as occurs when there is primarily a compression-type deflection. It requires less force to roll the web than to deform it in compression hence the cup 29 has a relatively low rate of deflection. It may be noted that the shape of web 31 would be even more effective in reducing the rate of deflection if the cup were circular, as in Fig. 6, rather than oval.

Another form of pedal cup 45 is shown in Figs. 6 and 7, and this also has a base portion 11 that is substantially the same as the bases of the cups 9 and 29. The web 47 is perpendicular to the base 11 but it joins the neck 49 in a generous fillet 51 that is formed on a radius preferably equal to the distance between the outer surface of the neck 49 and the inner surface of the main portion of the web 47. A radius or fillet 53 may be formed in the body of the neck 49 as a continuation of radius 51 and thus to provide a tapered inner end on the neck as well as a concave surface. The outer end of the neck 49 is provided with the outwardly flaring radius 55 that corresponds to the radii 41 and 25 of the previous modifications. In this embodiment, the web 47 is shown as circular in shape even though the opening 57 to receive the shank is oblong as is the opening 17 and neck 49. This tends to reduce resistance to collapse.

The concave shape of the web 47 adjacent the neck as provided by the generous fillet 51 results in a web deflection that is primarily rolling when the cup 47 is collapsed by the return spring. This plus the circular shape and the radius 55, as well as the axially parallel outer surface of neck 49, results in a cup with a low rate of deflection.

The pedal cup 61 of Figs. 8 and 9 has a cylindrical base section 63, a cylindrical neck 65, and a web 67 joining the neck and base and of greater width than either. The web consists of three sections, viz: (1) a short radial section 69 that extends perpendicular to the axis of the neck 65, (2) a divergent section 71 that extends from the section 69 toward the base 63, and (3) a converging section 73 that makes an angle at preferably about the center plane of the cup with the web section 71. The section 69 preferably blends into the outermost radial face of the cup as defined by the outer end of the neck 65 and on its inner face blends into the periphery of the neck in a radius 75. The section 69 is preferably of the same thickness as the web section 71. The web section 73, however, is tapered to increase in thickness as it converges inwardly toward the base 63 and its outer surface blends into the outer diameter of the base 63 while its inner surface blends into the inner diameter of the base which defines the aperture 77 that extends around the floorboard aperture 3. The neck 65 has an aperture 79 for the pedal shank. A radius 81 is provided that blends the aperture into the outer face of the cup. The cup illustrated has a circular aperture 79 for a circular pedal shank 1 and hence, preferably, the neck, web, and base are also circular in shape as illustrated.

The cup 61 incorporates advantages of both the rolling and bending types of deflection. In the early stages of collapse, the web section 71 tends to bend about junction 67 and the entire web to bend about its juncture with the base 63. The shape is such that the web also tends to roll-up on a large radius. These characteristics provide a low rate of deflection. The increasing thickness of section 73, however, provides an increasing resistance to rolling which, at the late stages of collapse, is sufficient to prevent the cup from turning inside out.

The pedal seal 85 of Figs. 10 and 11 has a base portion and a neck portion that are the same as the base and neck 11 and 13 of the pedal 9, and hence are designated by these reference numerals. The web 87 consists of two sections, viz: (1) the section 89 that is of uniform thickness and radial to the axis of the pedal cup, and (2) the section 91 that is cylindrical on its outer surface about the axis of the pedal cup but conical on its inner surface so as to provide a wall that increases in thickness toward the base 11. The sections 89 and 91 blend together in a generous radius 93. Section 89 is preferably of uniform thickness and its inside surface in the embodiment illustrated lies in the plane of the inner end of the neck 13.

The conical inner surface of the web 91 promotes rolling of the web and thus tends to reduce the rate of deflection. The increasing wall thickness serves as before to provide increasing resistance to collapse and to prevent turning inside out.

Three forms of a different type of pedal seal are illustrated in Figs. 12–14. These seals are secured to the floorboard 5 and are therefore stationary in contrast to the cups described hereinbefore which move with the pedal shank 1. For this purpose, the pedal cup 97 of Fig. 12 has a neck 99 and a radial flangelike web 101 that lies in a plane of the end face of the neck 99 and perpendicular to the axis of the seal. The flange 101 is secured to the floorboard 5 around the shank aperture 3 and this is preferably done by forming reverse bends 103 and 105 on the floorboard and flange, respectively, which interlock to hold the seal 97 in fixed position relative to the floorboard 5. The neck 99 has an aperture 107 to receive the pedal shank and this preferably is defined by a convex wall having a minimum radius at the midplane of the seal. This provides a minimum of resistance to movement of the shank 7 through the opening 107, but at the same time, effectively seals the floorboard opening against the passage of gases.

The pedal seal 111 of Fig. 13 is similar to the seal 97 and thus its neck will be referred to by the same reference number 99. The seal 111 has a reversely bent circumferential flange 105 at the outer radius of its web 113. The web 113 has an annular wrinkle 115 formed therein which represents an increase in the actual length of the web as compared with the web 101 of the seal 97. Thus, the neck 99 may more readily move relative to the floorboard 5 in the event that friction between the walls of its aperture 107 and the shank 1 is sufficient during movement of the shank to urge a deflection of the neck.

In the pedal seal 119 of Fig. 14, a neck 124 is provided with an aperture 107 and the web 123 extends radially therefrom at a central plane of the seal. The web 123 has a wrinkle 125 formed therein which extends in the opposite direction to the wrinkle 115. The web 123 also has a reversely bent flange 105 formed thereon to interlock with the floorboard.

Certain of the forms not claimed herein are being claimed in a divisional application, Serial No. 574,480, filed March 28, 1956.

I claim:

1. A pedal cup of rubber or the like comprising a neck portion having a pedal shank receiving aperture therethrough, a base portion of greater width than the neck portion having an aperture aligned with the neck aperture which is of larger size than the neck aperture whereby the neck may be received in the aperture, in relaxed condition of said cup said portions being axially spaced, and a flexible web integrally interconnecting and spacing the neck and base portions, said web consisting of two integral flexing sections intersecting at an acute angle, viz., (1) a section extending from the base toward the neck and diverging outwardly and decreasing in thickness, and (2) a section of uniform thickness extending from the outer end plane of the neck toward the base and diverging outwardly to join the first section at an intermediate plane of the cup.

2. A pedal cup of rubber or the like comprising a neck portion having a pedal shank receiving aperture therethrough, a base portion of greater width than the neck portion having an aperture aligned with the neck aperture which is of larger size than the neck aperture whereby the neck may be received in the aperture, in relaxed condition of said cup said portions being axially spaced, and a flexible web integrally interconnecting and spacing the neck and base portions, said web consisting of two integral flexing sections intersecting at an acute angle, viz., (1) a section extending from the base toward the neck and diverging outwardly and decreasing in thickness, and (2) a section of uniform thickness extending from the outer end plane of the neck toward the base and diverging outwardly to joint the first section at about the midplane of the cup, said neck extending inwardly from the second section and having the outer end of its aperture flared outwardly.

References Cited in the file of this patent

UNITED STATES PATENTS

| | | |
|---|---|---|
| 1,800,578 | Webb | Apr. 14, 1931 |
| 1,828,868 | King | Oct. 27, 1931 |
| 1,900,448 | King | Mar. 7, 1933 |
| 1,952,876 | Lucey | Mar. 27, 1934 |
| 1,963,940 | Duffy | June 19, 1934 |
| 2,123,004 | Farkas | July 5, 1938 |
| 2,477,882 | La Brie | Apr. 2, 1949 |
| 2,506,140 | Delany | May 2, 1950 |
| 2,544,541 | McCarthy et al. | Mar. 6, 1951 |
| 2,620,208 | Patch et al. | Dec. 2, 1952 |